US009322744B2

(12) United States Patent
Shima et al.

(10) Patent No.: US 9,322,744 B2
(45) Date of Patent: Apr. 26, 2016

(54) TIRE AIR PRESSURE MONITOR DEVICE

(75) Inventors: Takashi Shima, Milton Keynes (GB); Kazuo Sakaguchi, Ebina (JP); Syoji Terada, Hiratsuka (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 58 days.

(21) Appl. No.: 14/117,765

(22) PCT Filed: Feb. 20, 2012

(86) PCT No.: PCT/JP2012/053976
§ 371 (c)(1),
(2), (4) Date: Nov. 14, 2013

(87) PCT Pub. No.: WO2012/157308
PCT Pub. Date: Nov. 22, 2012

(65) Prior Publication Data
US 2014/0088816 A1 Mar. 27, 2014

(30) Foreign Application Priority Data

May 17, 2011 (JP) .................................. 2011-110001
May 23, 2011 (JP) .................................. 2011-115005

(51) Int. Cl.
*G01M 17/02* (2006.01)
*G06F 17/00* (2006.01)
*B60C 23/04* (2006.01)

(52) U.S. Cl.
CPC ............ *G01M 17/02* (2013.01); *B60C 23/0416* (2013.01); *B60C 23/0459* (2013.01); *B60C 23/0488* (2013.01); *B60C 23/0489* (2013.01)

(58) Field of Classification Search
CPC .......... G06F 17/00; B60C 23/00; B60C 23/04; B60C 23/0416; B60C 23/0433; B60C 23/0489; G01M 17/02
See application file for complete search history.

(56) References Cited

U.S. PATENT DOCUMENTS 6,112,587 A * 9/2000 Oldenettel .................... 73/146.5
7,289,022 B2 * 10/2007 Ogawa et al. ................ 340/447

(Continued)

FOREIGN PATENT DOCUMENTS

DE WO2010034703 * 4/2010
JP 2005-321958 A 11/2005

(Continued)

*Primary Examiner* — Jerrah Edwards
*Assistant Examiner* — Aaron Smith
(74) *Attorney, Agent, or Firm* — Young Basile Hanlon & MacFarlane P.C.

(57) ABSTRACT

Provided is a tire air pressure monitoring device capable of accurately determining the wheel position of a transmitter. The tire air pressure monitoring device comprises: a transmitter installed on each wheel for transmitting detected air pressure information via a wireless signal; a rotational position detection mechanism disposed on the vehicle body side which detects the rotational position of each wheel and also outputs rotational position information to a communications line at prescribed time intervals; and a vehicle body side rotation position estimation mechanism that estimates the rotational position (i.e., number of teeth) at the time of transmission by the transmitters, on the basis of the reception information for the wireless signal from the transmitters and the rotation position information for the wheels input via the communications line.

11 Claims, 8 Drawing Sheets

(56) References Cited

U.S. PATENT DOCUMENTS

| | | | |
|---|---|---|---|
| 8,332,103 B2 * | 12/2012 | Greer et al. ................... 701/49 |
| 8,436,724 B2 * | 5/2013 | Hannon ............. B60C 23/0416 340/445 |
| 8,659,411 B2 * | 2/2014 | Fink ................... B60C 23/0489 340/442 |
| 2005/0248446 A1 | 11/2005 | Watabe et al. |
| 2006/0049923 A1 | 3/2006 | Miyazaki |

FOREIGN PATENT DOCUMENTS

| | | |
|---|---|---|
| JP | 2006-123725 A | 5/2006 |
| JP | 2006-138803 A | 6/2006 |
| JP | 2007-245982 A | 9/2007 |
| JP | 2010-122023 A | 6/2010 |
| JP | 2011-070400 A | 4/2011 |
| WO | 2004-021302 A1 | 3/2004 |

* cited by examiner

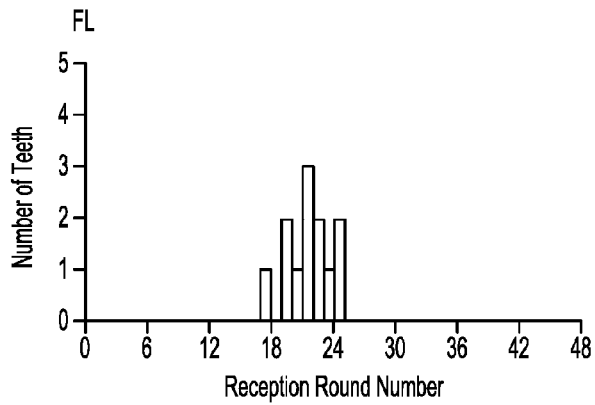
FIG. 9A
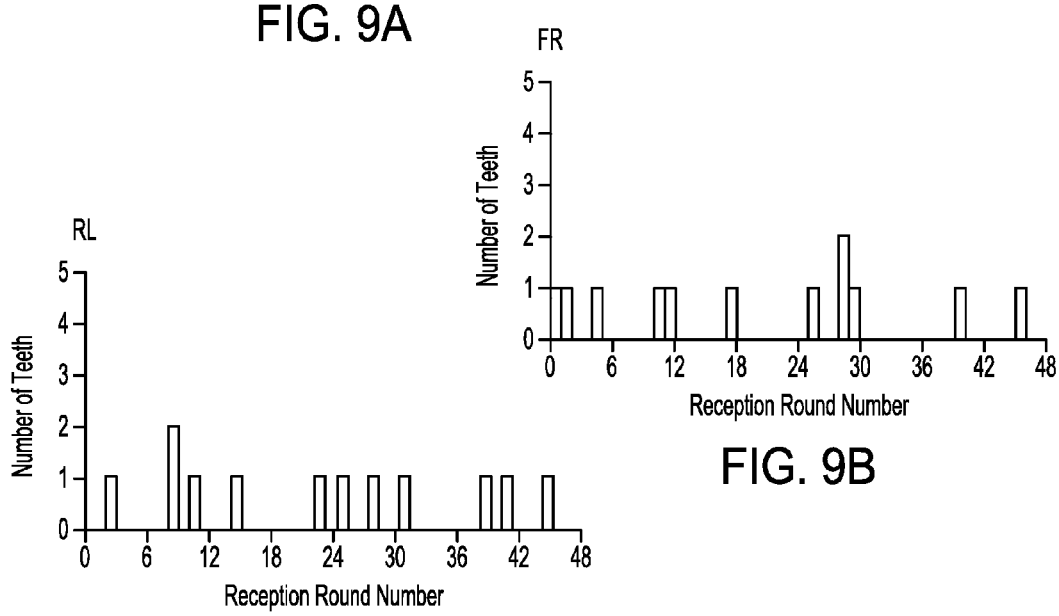
FIG. 9B
FIG. 9C
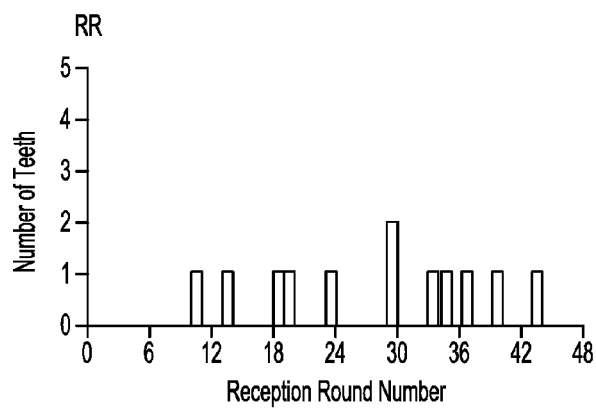
FIG. 9D

TIRE AIR PRESSURE MONITOR DEVICE

CROSS-REFERENCE TO RELATED APPLICATIONS

This national stage application claims priority to Japanese Patent Application No. 2011-110001 filed on May 17, 2011, and claims priority to Japanese Patent Application No. 2011-115005 filed on May 23, 2011, both of which are incorporated herein in their entirety.

TECHNICAL FIELD

The present invention relates to a tire pressure monitoring device for monitoring an air pressure of each tire of a vehicle.

BACKGROUND

Conventionally, Japanese Patent Application JP 2007-245982 A teaches a tire air pressure monitoring device for determining on which wheel a transmitter of a tire pressure sensor installed on a tire of each wheel is positioned.

During a vehicle running, the transmitter rotates together with the wheel and the difference may occur in the rotation speeds among the respective wheels. Therefore, in order to accurately determine the wheel position of the transmitter, it is preferable to accurately detect a rotational position (rotational angle) at which the transmitter of each wheel performs transmission on a side of vehicle body. However, if the rotational position information of the wheel detected by the vehicle body side is input sporadically at a predetermined time interval, it may be difficult to detect the rotational position accurately on the vehicle body side with a possibility of deterioration in the detection accuracy of the transmitter. An object of the present invention is to provide a tire pressure monitoring device that can determine more precisely the wheel position of the transmitter.

BRIEF SUMMARY

In order to achieve the above object, according to the present invention, the rotational position at the time of transmission from the transmitter is estimated based on the rotational positions of the wheel which are input immediately before a receiving start of the wireless signal from the transmitter and immediately after the receipt completion respectively input via a communication line, the time of input of rotational position of the wheel, and the receiving start time or receipt completion time. Since it is possible to detect more accurately the rotational position of a transmitter of each wheel when the transmitter transmits, the wheel position of the transmitter may be detected more accurately.

BRIEF DESCRIPTION OF THE DRAWINGS

The description herein makes reference to the accompanying drawings wherein like reference numerals refer to like parts throughout the several views, and wherein:

FIGS. 9A-9D are diagrams illustrating a relationship between the rotational positions (the number of teeth of the rotor) of each of the wheels 1FL, 1FR, 1RL, 1RR, respectively, when the rotational position of the TPMS sensor 2FL of the left front wheel 1FL assumes the highest point and the number of receipt of the TPMS data;

DETAILED DESCRIPTION

In the following, the embodiments for carrying out the present invention will be described with reference to drawings.

Figure 1:
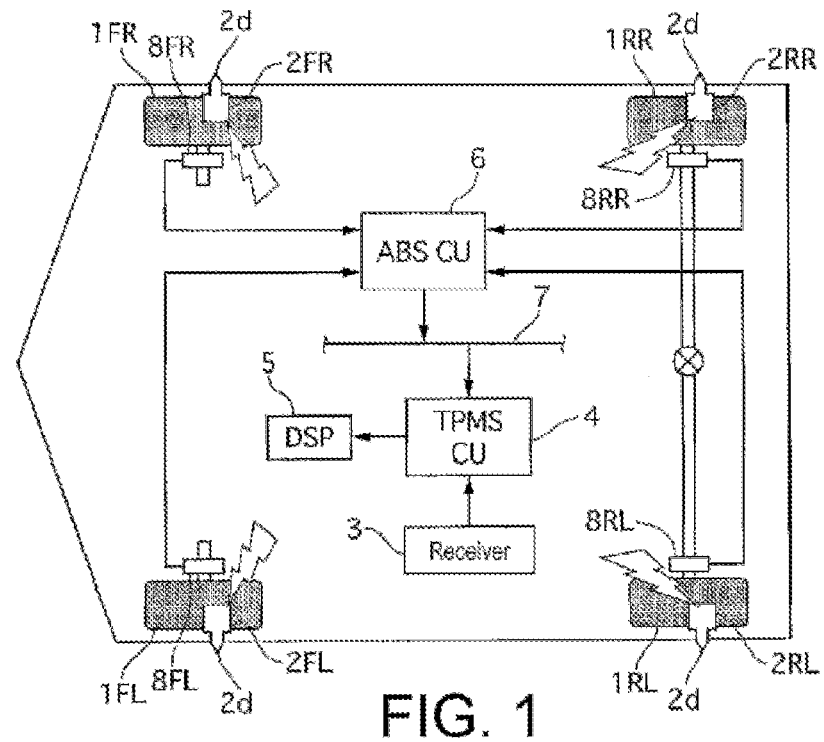
FIG. 1 is a configuration diagram illustrating a configuration of the tire air pressure monitoring device in a first embodiment.

FIG. 1 is a configuration diagram illustrating a tire air or pneumatic pressure monitoring device in a first embodiment. In this figure, the end letters annexed to each reference sign is intended to indicate as follows: FL stands for the left front wheel, FR stands for the right front wheel, RL stands for the left rear wheel, and RR stands for the right rear wheel, respectively. In the following description, when not specifically necessary, the description of FL, FR, RL and RR will be omitted.

The tire pneumatic or air pressure monitoring device in the first embodiment is provided with TPMS (tire pressure monitoring system) sensors 2, a receiver 3, a TPMS control unit (TPMSCU) 4, a display 5, and wheel speed sensors 8. A TPMS sensor 2 is installed on each of the wheels 1, and the receiver 3, the TPMSCU 4, the display 5 and the wheel speed sensors 8 are arranged on the side of the vehicle body.

Figure 2:
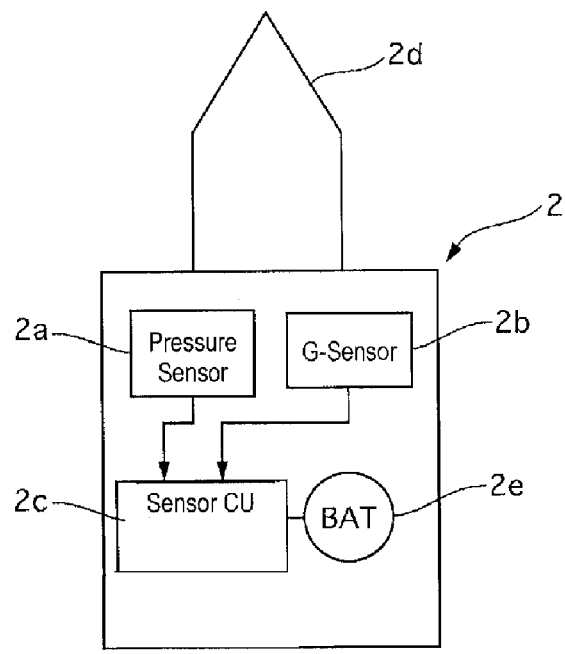
FIG. 2 is a configuration diagram of a tire pressure monitoring system (TPMS) sensor.

The TPMS sensor 2 is installed at the position of an air valve (not shown in the figure) of each tire. FIG. 2 is a diagram illustrating the configuration of the TPMS sensor 2. The TPMS sensor 2 comprises a pressure sensor (a tire pneumatic pressure detecting mechanism) 2a, an acceleration sensor (G sensor) 2b, a sensor control unit (sensor CU) 2c, a transmitter 2d, and a button battery 2e.

Here, the pressure sensor 2a detects the pneumatic pressure [kPa] of the tire. The G sensor 2b detects the acceleration in the centrifugal direction [G] acting on the tire.

The sensor CU 2c operates under the power supplied from the button battery 2e, and the TPMS data containing the pneumatic pressure information of the tire detected by the pressure sensor 2a and the sensor ID (the identification information) is sent as a wireless signal from the transmitter 2d. In the first embodiment, the sensor IDs are defined as 1 to 4.

The sensor CU2c compares the acceleration in the centrifugal direction detected by the G sensor 2b with a preset threshold for determination of a vehicle running state. When the acceleration in the centrifugal direction is less than the running determination threshold, a determination is made that the vehicle is being stopped or stationary, so that transmission of the TPMS data is stopped. On the other hand, when the acceleration in the centrifugal direction exceeds the running determination threshold, a determination is made that the vehicle is running, and the TPMS data will be transmitted at a prescribed timing The receiver 3 receives the wireless signals output from each TPMS sensor 2 to decode and output to the TPMSCU 4.

Figure 3A:
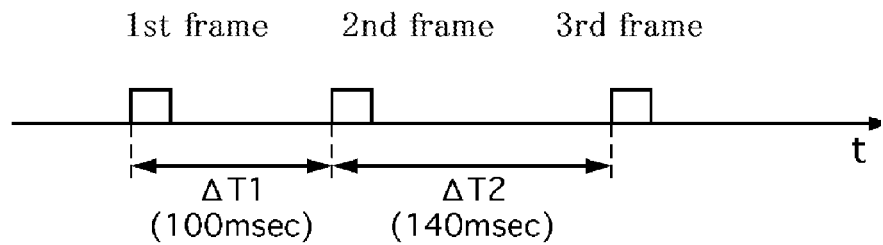
FIG. 3A is a diagram illustrating transmission method of each frame of the TPMS data in a first embodiment.

The TPMSCU 4 reads respective TPMS data, based on the sensor ID in the TPMS data and with reference to the correspondence relationship between each of the sensor IDs and the wheel positions (FL, FR, RL, RR) stored in a nonvolatile memory $4d$ (see FIG. 3A), the TPMSCU4 determines to which wheel position the TPMS data is corresponding and indicates on the display 5 a tire air pressure contained in the TPMS data as the pneumatic pressure of the corresponding wheel position. When the pneumatic pressure of a tire becomes below a lower limit threshold, the decrease in the pneumatic pressure is notified by a change in the display color, in flashing on the display, by an alarm sound, or the like.

Each wheel speed sensor 8 is a pulse generator that generates a chain of pulses of predetermined number z ($z=48$, for example) per rotation of the wheel 1, and is composed of a gear-shaped rotor that rotates in synchronization with the wheel 1 and a stator (permanent magnet plus coil) disposed to face the outer periphery of the rotor on a vehicle body. When the rotor rotates and causes the projection or protruding surface of the rotor to cross a magnetic field formed about the periphery of the stator to thereby change the magnetic flux density to produce an electromotive force, the change in which is output as pulse signals to the ABS control unit (ABSCU) 6.

The ABSCU 6 detects the wheel speed of each wheel 1 based on the wheel speed pulses from each of the wheel speed sensors 8, and, when a certain wheel exhibits a locking tendency, performs an anti-skid braking control by actuating an ABS actuator (not shown) to adjust or hold a wheel cylinder pressure of that wheel to thereby suppress the locking tendency. The ABSCU outputs to a CAN communication line a count value of the wheel speed pulses at a predetermined time interval $\Delta T0$ (20 msec. of period or cycle, for example).

As described above, based on the correspondence relationship between the sensor ID and the wheel position stored in the memory $4d$, the TPMSCU 4 determines to which wheel the received TPMS belong. Consequently, when a tire rotation is carried out while the vehicle stops, the correspondence relationship between the sensor ID and the wheel position stored in the memory $4d$ is not in agreement with the actual correspondence relationship, and it is impossible to find out to which wheel the TPMS data belong. Here, the "tire rotation" refers to the operation of swapping the installing wheel positions of the tires so as to ensure an even tread wear of the tires and, thus, to prolong the service lifetime (the tread lifetime). For example, for a passenger vehicle, usually the front/rear wheel tires are swapped while the left/right wheel tires.

Here, according to the first embodiment, in order to update and store the correspondence relationship between each sensor ID and each wheel position after a tire rotation in the memory $4d$, when there is a possibility that a tire rotation has been carried out, the transmission period of TPMS data on the side of each TPMS sensor 2 will be changed based on the transmission period of the TPMS data and each wheel speed pulse.

When the vehicle stop determination time immediately before the start of running of the vehicle is equal to or greater than a prescribed time (e.g. 15 min.), the sensor CU2c of the TPMS sensor 2 determines that the tire rotation may have been carried out.

When the vehicle stop determination time immediately before the start of running of the vehicle is less than the prescribed time T1, the sensor CU 2c executes a "normal mode" in which the TPMS data are transmitted at each constant or prescribed interval (e.g., at one minute intervals). On the other hand, when the vehicle stop determination time is equal to or greater than the prescribed time T1, the sensor CU executes a "constant or fixed position transmission mode" in which, in an interval shorter than the transmission interval in the normal mode (e.g., in an interval of about 16 seconds), the TPMS data are transmitted at a constant or prescribed rotational position.

The constant position transmission mode is executed until the number of transmission of the TPMS data reaches a prescribed number of times (e.g., 40 rounds). When the number of times of the transmission reaches the prescribed number of times, the constant position transmission mode transfers to the normal mode. When a determination has been made that the vehicle stops before the number of transmission times of the TPMS data reaches the prescribed number of times, if the vehicle stop determination time is shorter than the prescribed time (15 min.), the constant position transmission mode before the vehicle stop is continued until the number of times of transmission reaches the prescribed number of times. When the vehicle stop determination time is longer than the prescribed time, the continuation of the constant position transmission mode before the vehicle stop is cancelled, and a new constant position transmission mode is started.

In the constant position transmission mode, based on the gravity acceleration dependent component of the acceleration in the centrifugal direction detected by the G sensor $2b$, the sensor CU2c determines a transmission timing of the TPMS data in the constant position transmission mode. The acceleration in the centrifugal direction acting on the TPMS sensor 2 varies in accordance with the acceleration/deceleration of the wheels 1, yet the gravity acceleration dependent component is always constant. That is, the acceleration in the centrifugal direction acting on the TPMS sensor shows a waveform with +1 [G] at a top point, −1 [G] at a bottom point of, and 0 [G] in the middle position of 90° between the top point and bottom point. In other words, by monitoring the magnitude and direction of the gravity acceleration component of the acceleration in the centrifugal direction, it is possible to grasp or identify the rotational position of the TPMS sensor 2. As a result, for example, by outputting the TPMS data at a peak of the gravity acceleration dependent component, the TPMS data may be output constantly at the top point.

In the constant position transmission mode, the sensor CU2c transmits a plurality of, more specifically three of a frame of the same content including the tire pressure information and the sensor ID. The first frame is transmitted at the top point, and with time interval other frame is transmitted. More specifically, the second frame is transmitted a first time interval $\Delta T1$ (100 msec. for example) after the transmission of the first frame, the third frame after a time interval $\Delta T2$ (140 msec., for example). A frame number (1 to 3) is added as identification information in each frame so that the order of the frame will be apparent.

When the time that has elapsed from OFF to ON position of the ignition switch for a predetermined time T2 (e.g., 15 min.) or more, the TPMSCU 4 determines that the tire rotation may have been carried out.

When the time that has elapsed from OFF to ON of the ignition switch is shorter than the predetermined time T2, based on the pneumatic pressure information in the TPMS transmitted from each TPMS sensor 2, the TPMSCU4 executes a "monitor mode" in which the pneumatic pressure of the tire of each wheel 1 is monitored. On the other hand, when the elapsed time from OFF to ON of the ignition switch is longer than the predetermined time, the TPMSCU4 executes an "auto-learning mode" which will be carried out until the wheel positions of all TPMS sensors 2 are determined, or until a predetermined, cumulative travel time (e.g. 8 min.) from the start of this mode has elapsed. When the wheel positions of all TPMS sensors are determined, or, the predetermined cumulative time has passed, control transfers to the monitor mode.

Even in the auto-learning mode, it is still possible to monitor the pneumatic pressure of the tires from the pneumatic pressure information contained in the TPMS data. Consequently, the display of the pneumatic pressure and the warning of a decreased pneumatic pressure are carried out based on the correspondence relationship between the sensor ID and the wheel position currently stored in the memory 4d during the automatic running mode.

In the auto-learning mode, the TPMSCU 4 receives a count value of the wheel speed pulses from the ABSCU 6 via the CAN communication line 7 and executes the wheel position determination control described below.

Figure 4:
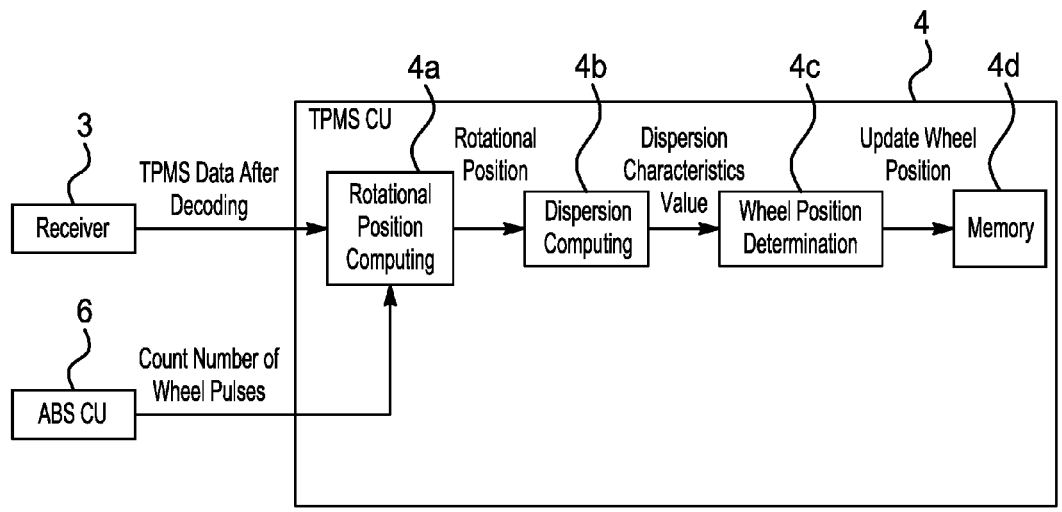
FIG. 4 is a control block diagram of a TPMS control unit for executing the wheel position determination control.

FIG. 4 is a control block diagram of the TPMSCU 4 for executing the wheel position determination control. The TPMSCU 4 has a rotational position calculation unit (the rotational position detecting mechanism) 4a, a dispersion calculation section 4b, a wheel position determination section (the wheel position determination mechanism) 4c, a memory 4d, a rotational position detection inhibition unit (detection inhibition mechanism) 4e.

The rotational position calculation unit 4a receives the TPMS data after being decoded to be output from the receiver 3 and the count values of the wheel speed pulses output from the ABSCU 6 to the CAN communication line 7 to calculate a rotational position (number of teeth of rotor) for each rotor when the rotational position of each TPMS sensor assumes the top point. Note that the "number of teeth" indicate which tooth the wheel speed sensor 8 is counting and may be acquired by dividing the count value of the wheel speed pulses by a count value per rotation of the tire (i.e., the number of teeth per rotation z=48). In the first embodiment, when the count value of the wheel speed pulses of the first time from the start of the auto-learning mode is input, the value obtained by adding 1 to the remainder of the division operation of the count value by the number of teeth of 1 cycle or rotation is taken as the reference number of teeth. In the second and subsequent times, based on the number of count of the wheel speed pulses with respect to the reference number of teeth (i.e., current count value the count value at the first time), the number or teeth may be determined.

Figure 5:
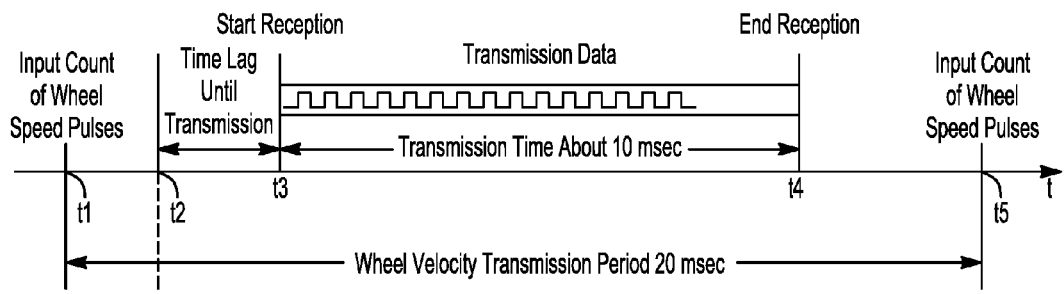
FIG. 5 is a diagram illustrating a method for calculation of a rotational position of the TPMS sensor (transmitter)

FIG. 5 is a diagram showing a method for calculating the rotational position of the TPMS sensor 2 (transmitter 2d) of each wheel 1.

The rotational position calculation unit 4a, each time of receipt of the TPMS data (first to third frame), stores the time of receipt and the data content. Further, each time the count value of the wheel speed pulse via the CAN communication line 7 is received, both the input time and the count value are stored.

First, explanation is given when the first frame has been received. In FIG. 5, t1 represents the time at which the count value (previous value) of the wheel speed pulses is input immediately before the receipt of the TPMS data (first frame); t2 represents the time when the rotational position of the TPMS sensor 2 reaches the top point and the transmission of the TPMS data (first frame) is commanded; t3 represents the time when the TPMS sensor 2 actually starts the transmission of the TPMS data (first frame), which may be regarded at the same time when the TPMSCU4 starts receiving the first frame; t4 represents the time when the reception of the TPMS data (first frame) by the TPMSCU 4 is completed; and t5 represents the time when the count value of the wheel speed pulses is input. In this case, which may be regarded as the same time as the time at which the TPMS sensor 2 ends to transmit the first frame, t1, t4, and t5 is the time of input of the count value (current value) for the wheel speed pulses immediately after receipt of the TPMS data (first frame). The rotational position calculation unit 4a, in addition to storing the time t1, t4, and t5, calculates time t3 by subtracting from the time t4 the transmission time $\Delta t1$ (which is previously prescribed as the value unique to the transmitter 2d depending on the data length, 10 msec., for example) of the TPMS data (first frame), i.e., $t4-\Delta t0=t3$. Note that, instead of calculating the time t2 from the time t4, the time t3 may be directly detected and stored for calculation of the time t2 based on the time t3.

Consequently, supposing the number of teeth at t1 is zt1, the number of teeth at t2 is zt2, and the number of teeth at t5 is zt5, respectively, the equation that follows is established: $(t2-t1)/(t5-t1)=(zt2-zt1)/(zt5-zt1)$.

Because $zt2=zt1+(zt5-zt1)*(t2-t1)/(t5-t1)$, the number of teeth zt2 is expressed in the following equation when the rotational position of the TPMS sensor 2 is at the top point:

$$zt2=zt1+(zt5-zt1)*(t2-t1)/(t5-t1) \qquad (1)$$

wherein $(zt5-zt1)/(t5-t1)$ corresponds to the number of teeth per unit time.

Figure 6:
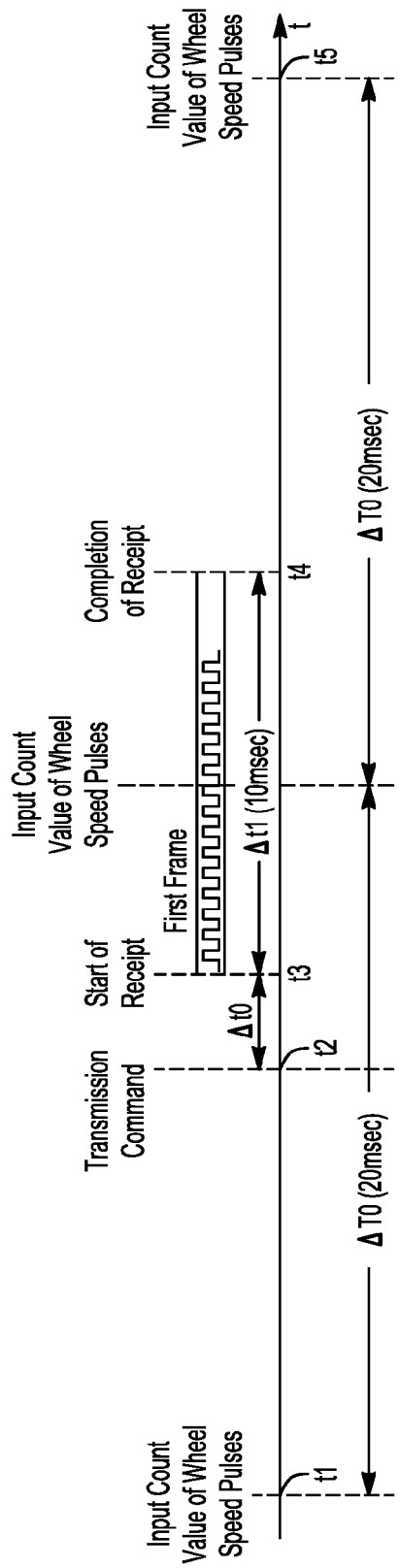
FIG. 6 is another diagram illustrating a method for calculation of a rotational position of the TPMS sensor (transmitter)

It should be noted that the count value of the wheel speed pulses is input during the receipt of the TPMS data (FIG. 6). In this case, too, based on the time t1 in which the count value of the wheel speed pulse immediately before the receipt of the TPMS data and the time t5 in which the count value of the wheel speed pulse immediately after the receipt of the TPMS data, the number of teeth z12 at the time t2 may be calculated using the equation described above.

As described above, the rotational position calculation unit 4a calculates the rotational position with respect to each wheel at the time of transmission from the transmitter 2d (transmission command time t2) based on the received information (receipt completion time t4) of the wireless signal (transmission data) from the transmitter 2d and the rotational position information of the wheel 1 (input times t1, t5, number of teeth, zt1, zt5) input via the CAN communication line 7.

Next, a description will be given of a calculation method in the case of receiving a second frame without receiving a first frame. The second frame is transmitted 100 msec. after the transmission of the first frame, i.e., after a time interval of $\Delta T1$ that is five times of the period $\Delta T0$ (20 msec.) with which the count value of the wheel speed pulses is input. Thus, in the equation (1) above, when using previous zt1 and zt5 that are ahead of five times of the period ($\Delta T0 \times 5$) with which the count value of the wheel speed pulse is input, the rotational position zt2 of the wheel at the time at which the rotational position of the TPMS sensor 2 has reached the highest or top point (at the time at which the transmission of the first frame is commanded) may be calculated. More specifically, it is assumed that the time at which the count value (previous value) of the wheel speed pulses immediately before receipt of the second frame is t1', the time at which the second frame is commanded to be transmitted at elapse time of 100 msec. of the transmission command time t2 of the first frame is t2', the time at which the TPMSCU4 has completed to actually receive the second frame is t4', and the time at which the count value of the wheel speed pulse (current value) is input immediately after completion of receipt of the second frame is t5'. The rotational position calculation unit 4a stores the times t1', t4' and t5'. In addition, upon determining the receipt of the second frame based on a frame number, based on the following equations:

$$t1 = t1' - 100 \text{ msec.},$$

$$t4 = t4' - 100 \text{ msec.},$$

$$t5 = t5' - 100 \text{ msec.}$$

The times t1, t4 and t5 (see FIG. 5) are calculated, respectively. Further, the rotational position calculation unit 4a stores the number of teeth zt1 at the time t1, zt5 at the time t5. Moreover, the following equation is established: (t2−t1)= {t4−(t4−t3)−(t3−t2)−t1}={t4'−(t4'−t3')−(t3'−t2)'−'t1}. That is, (t4'−t1')=(t4−t1), (t4'−t3')=(t4−t3)=Δt1, (t3'−t2')=(t3−t2)=Δt0. Therefore, the number of teeth zt2 when the rotational position of the TPMS sensor 2 has reached the highest or top point at the time t2 may be calculated by the above equation (1). In addition, after calculating in the same manner as the above equation (1) to obtain the number of teeth at the transmission command time t2' of the second frame in the transmission command time t2' of the second frame, by subtracting the number of teeth of 100 msec., the number of teeth zt2 at the time of the transmission command t2 of the first frame may be calculated as well.

Now, description is given of a calculation method when receiving the third frame without receiving the first and second frames. The third frame is set 140 msec. after the transmission of the second frame, i.e. after a time interval ΔT2, seven times of the input period with which the count value of the wheel speed pulse is input (ΔT×7). Thus, the rotational position calculation unit 4a, upon determining the receipt of the third frame based on the frame number, calculates the number of teeth zt2 at the time at which the rotational position of the TPMS sensor 2 has reached the top point, using the values of zt1, zt5 which were present, 12 of periods (=5+7) before in the above equation (1).

Incidentally, the interval ΔT between the frames is not limited to the multiple of input period of the count value of the wheel speed pulses ΔT0 (20 msec.), but may use an arbitrary value. In this case, as well, the number of teeth zt2 at the time at which the rotational position of the TPMS sensor 2 has reached the top point (at the time t2 at which the transmission of the first frame is commanded) is calculated based on the received information (receipt starting time and receipt completion time of the frame other than the first frame) from the transmitter 2d and the rotational position information (input time of the count value and number of teeth) input via the CAN communication line 7. In the first embodiment, since the time interval ΔT1 between the frames is set to be a multiple (100 msec., 140 msec.) of the input period ΔT0 (20 msec.) from the CAN communication line 7, the calculation may be simplified.

The dispersion calculation unit 4b accumulates a rotational position of each wheel 1 which is calculated in the rotational position calculation unit 4a for each sensor ID to acquire rotational position data, and calculates a degree of dispersion in each rotational position data for each sensor ID as a dispersion characteristic value. The calculation of the dispersion characteristic value is made each time the rotational position for the identical sensor ID is calculated by the rotational position calculation unit 4a.

Figure 7:
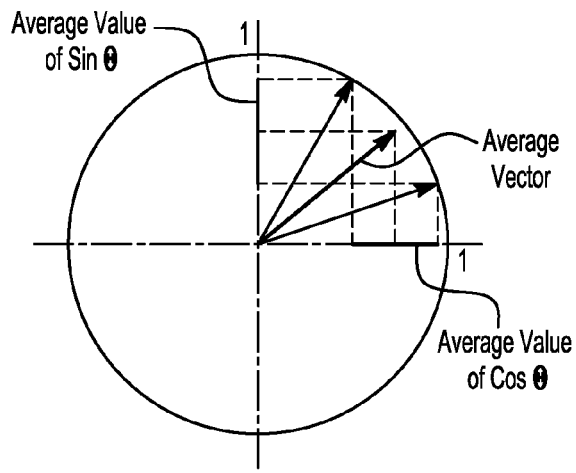
FIG. 7 is a diagram illustrating a method of calculation of a dispersion characteristic value.

FIG. 7 is a diagram illustrating a method for calculating the dispersion characteristic value. According to the first embodiment, a unit circle (a circle with radius of 1) with the origin (0, 0) on the two-dimensional plane is assumed, and the rotational position θ [deg] (=360×the number of teeth of the rotor/48) of each wheel 1 is converted to the circumferential coordinates (cos θ, sin θ) on the unit circle. More specifically, the rotational position of each wheel 1 is calculated as follows: regarding a vector having the origin (0, 0) as the starting point and the coordinates (cos θ, sin θ) as the end with a length of 1, the average vectors (ave_cos θ, ave_sin θ) of each vector of the same rotational position data are obtained, and the scalar quantity of the average vector is calculated as the dispersion characteristic value X of the rotational position data:

$$(\cos \theta, \sin \theta) = (\cos((zt2+1)*2\pi/48), \sin((zt2+1)*2\pi/48)).$$

Consequently, suppose the number of times of reception of the TPMS data with respect to the identical sensor ID as n (n is a positive integer), the average vectors (ave_cos θ, ave_sin θ) are expressed as follows:

$$(\text{ave\_cos } \theta, \text{ave\_sin } \theta) = ((\Sigma(\cos \theta))/n, (\Sigma(\sin \theta))/n).$$

The dispersion characteristic value X can thus be represented as follows:

$$X = \text{ave\_cos } \theta 2 + \text{ave\_sin } \theta 2.$$

The rotational position of the wheel 1 is the angle data of periodicity. By calculating the dispersion value X a scalar quantity of the average vector, it is possible to determine the variation degree of the rotational position by avoiding periodic.

The wheel position determination unit 4c compares the dispersion characteristic values X of each rotational positional data of the same sensor ID that is calculated by the dispersion calculation unit 4b. When the highest value of dispersion characteristic value X is greater than the first threshold value (for example, 0.57), and the dispersion characteristic values X of the remaining three are all less than a second threshold value (for example, 0.37), then, the wheel position of the rotational position data that correspond to the maximum dispersion characteristic value X, i.e. the wheel position of the wheel speed sensor 8 that has detected that rotational position data is determined as the wheel position of the TPMS sensor corresponding to the sensor ID of that rotational position data. By executing this determination for all sensor IDs, the correspondence relationships between each sensor ID and each wheel position may be acquired and stored in the memory 4d by updating process.

Instead of simply selecting the maximum value of the dispersion characteristic value X, by comparing the maximum value with the first threshold value (0.57), it is possible to ensure a certain degree of accuracy. Moreover, by comparing the dispersion characteristic values X other than the maximum value with the second threshold value (0.37), a predetermined difference between the maximum and the other three values may be confirmed so as to enhance the detection accuracy. Therefore, it is possible to achieve both shortening the determination time and ensuring the accuracy of the determination in the small number of receptions such as 10 times.

Figure 8:
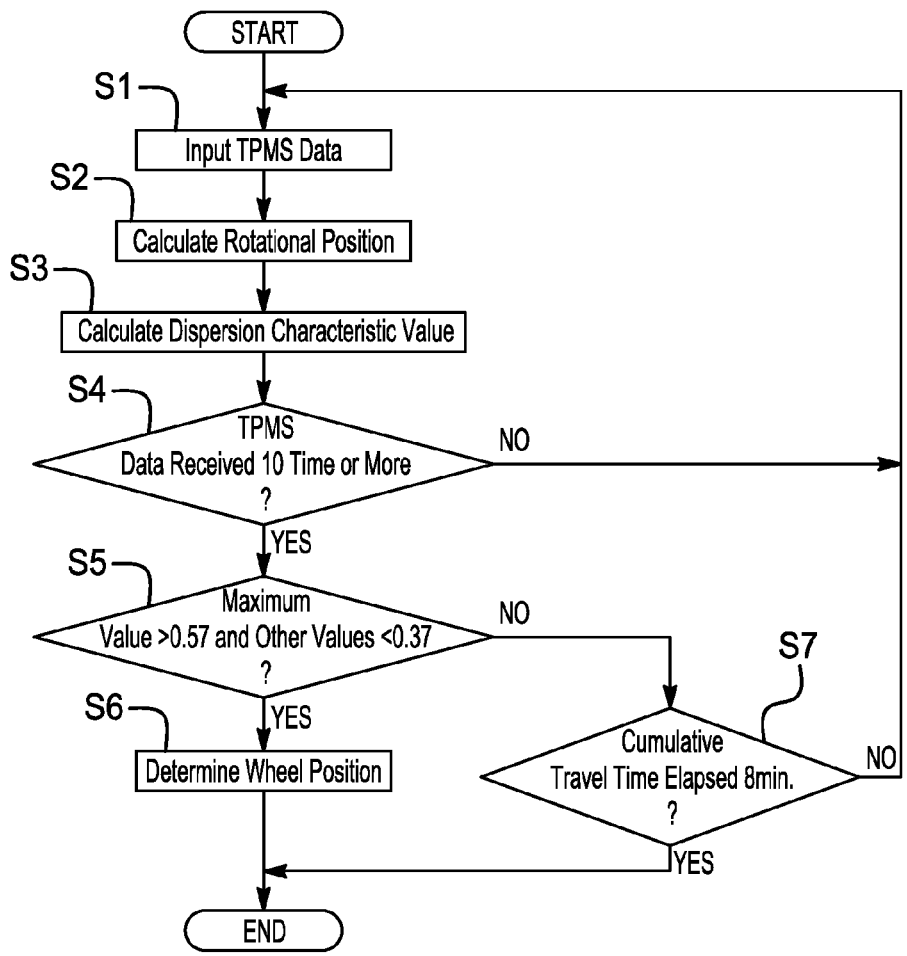
FIG. 8 is a flow chart illustrating a flow of the wheel position determination control process.

FIG. 8 is a flow chart illustrating the flow of the wheel position determination control process according to the first embodiment. In the following, respective steps of operation will be described. In the following description, the case of the sensor ID being "1" is assumed. However, for the other IDs (ID=2, 3, 4), the wheel position determination control process is also carried out in parallel.

In step S1, the rotational position calculation unit 4a receives the TPMS data with the sensor ID of 1. Upon receipt of at least one of the first to third frames, it is assumed that the TPMS data has been received once.

In step S2, the rotational position calculation section 4a calculates the rotational position of each wheel 1 based on the information of the received data (any one of the first to third frames).

In step S3, the dispersion calculation unit 4b calculates the dispersion characteristic values X of the rotational position data of each wheel 1.

In step S4, a determination is made as to whether the TPMS data with sensor ID of 1 are received for a prescribed number of times (e.g., 10 times) or more. If the determination result is YES, the operation goes to step S5. If the determination is NO, the operation returns to step S1.

In step S5, the wheel position determination section 4c determines whether the maximum value of the dispersion characteristics value is over the first threshold of 0.57, and whether the value of the remaining dispersion characteristic values are less than the second threshold of 0.37. If the determination is YES, the operation goes to step S6; if the determination result is NO, the operation goes to step S7.

In step S6, the wheel position determination section 4c determines the wheel position of the rotational position data corresponding to the highest or maximum dispersion characteristic value as the wheel position of that sensor ID. Then, the auto-learning mode ends.

In step S7, the wheel position determination section 4c determines whether a predetermined cumulative or accumulated running time (e.g., 8 min.) has elapsed from the start of the auto-learning mode. If the determination result is NO, the operation returns to step S1. If the determination result is YES, the auto-learning mode is terminated.

When the wheel position determination section 4c has been able to determine the wheel positions for all of the sensor IDs within the prescribed accumulated travel time, the correspondence relationship between the sensor ID and the wheel position is updated and stored in the memory 4d for registration. On the other hand, when it has been impossible to determine the wheel position for all of the sensor IDs within the prescribed accumulated travel time, the correspondence relationship between the sensor IDs and each wheel position currently stored in the memory 4d is continued to be used.

The TPMS sensor 2 works as follows: when the vehicle stop determination time right before the start of vehicle running is 15 min. or longer, a determination is made that there is a possibility that the tire rotation has been carried out, and the operation goes from the normal mode to the constant position transmission mode. In the constant position transmission mode, after 16 seconds has elapsed from the previous transmission time and the rotational position of own TPMS sensor reaches the predetermined position (the top point), each TPMS sensor 2 transmits the TPMS data. On the other hand, when the elapsed time between OFF and ON of the ignition switch is 15 min. or longer, the TPMSCU 4 goes from the monitoring mode to the auto-learning mode. In the auto-learning mode, each time the TPMS data is received from each TPMS sensor 2, the TPMSCU 4 calculates the rotational position (the number of teeth of the rotor) of each wheel 1 when the rotational position of the TPMS sensor 2 reaches the predetermined position (the top point) based on the input time of the count value of the wheel speed pulses, the time of completion of receipt of the TPMS data, and the like. This is carried out repeatedly for 10 or more times and accumulated as the rotational position data. Among the rotational position data, the wheel position corresponding to the rotational position data with least degree of dispersion is determined as the wheel position of that TPMS sensor 2.

Note that by setting a transmission interval at 16 seconds+ α, a certain amount of cumulative travel distance will be obtained until the TPMS data will be received ten times or more. Therefore, a sufficient difference in the dispersion characteristic value X between the own and other wheel may be created to ensure an accurate determination of the wheel position.

Upon transmitting TPMS data forty (40) times during the constant position transmission mode, the TPMS sensor 2 transfers to the normal mode. Specifically, the TPMS sensor 2 consumes the power of the button battery 2e most at the transmission of the TPMS data. Thus, when each wheel position may not be determined despite the elapse of sufficient cumulative travel time, the constant position transmission mode will be terminated to transfer to the normal mode, which may suppress decrease in battery life time.

On the other hand, when the TPMSCU4 cannot determine the correspondence between each sensor ID and each wheel position despite elapsed time of cumulative travel of eight (8) minutes, the auto-learning mode will be terminated and the process transitions to the monitoring mode. The total number of TPMS data is thirty (30) times or less when the cumulative travel time has passed eight minutes, the auto-learning mode may be terminated substantially in synchronization with the completion of the constant position transmission mode of the TPMS sensor 2.

Among the conventional tire pressure monitoring devices, such a tire pressure monitoring device is known in which by arranging the same number of receivers as the TPMS sensors are arranged close to each receiver and, based on the signal strength (i.e. the difference therein) in the received wireless signal, the wheel position of each TPMS sensor is determined. However, in this type of device, the layout of the receiver has to be contemplated in consideration of a sensor output, a receiver sensitivity variation, the harness antenna effect is required, the performance would be influenced by the reception environment or layout. Further, since four receivers are required, cost will increase.

In contrast, in the tire pressure monitoring device of the first embodiment, it is possible to determine the wheel position of each TPMS sensor 2 without using the (difference) signal strength. Therefore, it is possible to determine the position of each wheel TPMS sensor 2 regardless of the reception environment and layout. Further, since only one receiver 3 is required, it is possible to keep costs low.

As one of the conventional tire air pressure monitoring devices, an inclination sensor is arranged for each TPMS sensor, and the relationship between the wheel position of the TPMS sensor and the inclination angle is used to determine the wheel position of the TPMS sensor (for example, see JP 2007-245982 A). For this type of tire pneumatic pressure monitoring device, in response to running the vehicle, the difference in the rotation speed takes place between the 4 wheels, so that the correspondence between the wheel position of the TPMS sensor and the inclination angle varies. As a result, it is impossible to make a highly precise determination on the wheel position of each TPMS sensor. More specifically, when the vehicle travels or runs, the rotation speed of each wheel 1 may different from each other due to the difference in tracks between the outer and inner wheels, the lock and the slip of the wheels 1, and the difference in the pneumatic pressure of the tires. Even when the vehicle runs straight, as the driver still may make minute corrections on the steering wheel and there is a certain difference in the road surface between he left and right sides, the difference in the rotation speed still develops between the front and rear wheels 1FL and 1FR, and between the left and right wheels 1RL and 1RR. That is, there is a difference in rotation speed of each wheel in accordance with the running state of the vehicle.

In contrast, in the first embodiment, since the TPMS sensor 2 and the wheel speed sensor 8 (the teeth of the rotor thereof) rotate integrally, against the output period of a specific TPMS sensor 2, the output period of the wheel speed sensor 8 associated with the same wheel is kept being synchronized (in agreement) irrespective of the travel distance and the running state. In this perspective, the wheel position of the TPMS sensor 2 is determined based on the correspondence relationship between the rotational position (output of the TPMS sensor 2) of the TPMS sensor detected on the side of the wheel 1 and the rotational position (output of the wheel speed sensor 8) of the TPMS sensor 2 detected on the side of vehicle body. More specifically, the TPMS sensor on the wheel 1 detects the rotational position of the wheel 1 based on a gravitational acceleration dependent component of the centrifugal acceleration detected by a G sensor 2b and sends the TPMS data at the time when the rotational position has reached a predetermined, reference position (the top point in the first embodiment). The TPMSCU4 on the vehicle body calculates the rotational position (number of teeth of rotor zt2) of each wheel 1 at the time of transmission of the TPMS transmission data (i.e., when the TPMS sensor has reached the reference position or top point) each time the TPMS data is received from each TPMS sensor 2.

During the running state, assuming that the rotational position of each wheel 1 (number of teeth zt2) calculated in response to the transmission of certain specific TPMS sensor 2 (for example, ID=1) is limited within a predetermined range only with respect to a certain wheel 1 (for example, left front wheel 1FL). In this case, it is determined that there is a one to one correspondence between the rotational position (the calculation value zt2 described above) of the TPMS sensor 2 detected on the vehicle body and the rotational position (the reference position or top point at which the TPMS sensor 2 with ID of 1 performs a transmission) in this wheel 1 (left front wheel 1FL). Therefore, in the above described case, the wheel position of the TPMS sensor 2 with ID of 1 can be determined as the above wheel 1 (left front wheel 1FL).

By observing the degree of dispersion in the rotational position data of each wheel 1 with respect to a transmission period of the TPMS data, it is possible to make a highly precise determination on the wheel positions of each TPMS sensor 2.

FIGS. 9A-9D illustrate the relationship between the rotational positions (the number of teeth of the rotors) of the wheels 1FL, 1FR, 1RL, and 1RR, respectively, when the rotational position of the TPMS sensor 2FL of the left front wheel 1FL reaches the top point and the number of times of reception of the TPMS data. Here, FIG. 9A corresponds to the wheel speed sensor 8FL of the left front wheel 1FL, FIG. 9B corresponds to the wheel speed sensor 8FR of the right front wheel 1FR, FIG. 9C corresponds to the wheel speed sensor 8RL of the left rear wheel 1RL, and FIG. 9D corresponds to the wheel speed sensor 8RR of the right rear wheel 1RR.

As will be evident from FIGS. 9A-9D, whereas the dispersion degrees are high with respect to the wheel positions (the number of teeth) obtained from the wheel speed sensors 8FR, 8RL, and 8RR with respect to the other wheels (the right front wheel 1FR, the left rear wheel 1RL, and the right rear wheel 1RR), the dispersion degree of the wheel position obtained from the wheel speed sensor 8FL with respect to the own wheel (the left front wheel 1FL) is the smallest or least, so that the output period of the TPMS sensor 2FL and the output period of the wheel speed sensor 8FL are nearly synchronized with each other.

Incidentally, it may suffice when the wheel position of the TPMS sensor 2 is determined based on the rotational position (output of the wheel speed sensor 8) detected on the wheel 1 and the rotational position (output of the wheel speed sensor 8) detected on the vehicle body. Thus it is no necessarily required to use the dispersion characteristic value X as in the first embodiment. For example, after a vehicle travel of a predetermined distance, when a wheel 1 is detected with which the least change in the calculation value zt2 by the wheel speed sensor 8 with respect to a certain TPMS sensor output is present, the position of this wheel 1 may be determined as the wheel position of that TPMS sensor 2. In the first embodiment, however, by observing the degree of dispersion using the dispersion characteristic value X, the wheel position of each TPMS sensor 2 may be determined more accurately.

As the G sensor 2b of the TPMS sensor 2, rather than the acceleration in the centrifugal direction of the wheel 1, it is possible to use a G sensor for detecting an acceleration in the direction of rotation (vertical direction with respect to the centrifugal direction) for example. Further, the reference position for performing the transmission (output) by the TPMS sensor 2 is not necessarily to be the highest or top point, but it may be, for example, the foremost, end or lowest point. In the first embodiment, the state in which the rotational position of the TPMS sensor is at the top point is detected based on a gravitational acceleration dependent component of the centrifugal acceleration detected by the G sensor 2b. Since the G sensor 2b is generally used in the existing tire pressure monitoring device to determine a stop or running state, the existing sensor may commonly employed so that the additional cost for new sensor may be eliminated. Further, by making the top point to be a reference point, it is easy to discern that the rotational position of the TPMS sensor is at the reference position by the G sensor 2.

Further, in the first embodiment, TPMSCU4 calculates the rotational position of each wheel 1 based on the output of the vehicle speed sensor 8 (count value of the vehicle speed pulses). The ABS unit is installed in almost all the vehicles and the vehicle speed sensor 8 is an indispensable element for the ABS unit, an extra cost on the side of the vehicle would be avoided due to addition of a new sensor.

However, when using the existing system, wheel speed pulses output from the wheel speed sensor 8 is input as the discrete count values to the TPMSCU4 at a predetermined period ΔT0 via the CAN communication line 7. This would lead to discrepancies between the transmission time from the TPMS sensor 2 to the TPMSCU4 and the input time of the count value of the wheel speed pulses to the TPMSCU4. As shown in FIG. 5, between the time t1, t5 at which the count value of the wheel speed pulses is input and the time t2 at which the TPMS data is commanded to be transmitted when the rotational position of the TPMS sensor 2 has reached the reference position (top point), a difference (time lag) is present. Thus, the rotational position of each wheel 1 (number of teeth of rotor) at the time at which the rotational position of the TPMS sensor 2 has reached the reference position (top point) (i.e., at the time of transmission from that TPMS sensor 2) may not be calculated accurately based on the count value of the wheel speed pulses from the wheel speed sensor 8. In other words, when making correspondence between the rotational position (top point) of the TPMS sensor 2 detected on the side of wheel 1 and the rotational position (number of teeth of rotor) of the wheel 1 detected on the side of vehicle body, when using the count value input from the CAN communication line 7 as the rotational position of the wheel 1 without modifications, then the correspondence is inaccurate. Thus, the detection accuracy of the wheel position of the TPMS sensor 2 may deteriorate. Note that, when the input period ΔT0 of the count value from the TPMSCU4 to ABSCU6 is shortened, thereby setting the input timing of the count value to the TPMSCU4 closer to the transmission timing from the TPMS sensor 2 to the TPMSCU4, a drastic increase in the transmission speed via the CAN communication line 7 is necessary, what would lead to cost increase in the microcomputer (CU) or the like.

In contrast, in the first embodiment, the TPMSCU4 (rotational position calculation unit 4a) estimates the rotational position (number of teeth zt2) of the TPMS sensor 2 based on the received information (receipt completion time t4) from the TPMS sensor 2 and the rotational position information (input time t1, t5, number of teeth zt1, zt5) input discretely to the TPMSCU4 at a predetermined period ΔT0. More specifically, the number of teeth zt2 at the time t2 at which the rotational position of the TPMS sensor 2 has reached a reference position (top point) is calculated based on the equation (1) described above.

Thus, even when the rotational position of the wheel 1 (count value of the wheel speed pulses) is detected discretely on the side of vehicle body, the rotational position of each TPMS sensor 2 (rotational position (number of teeth zt2) of each wheel at the time at which the TPMS sensor 2 has reached a reference value (top point)) may be estimated accurately. Thus, it is possible to correspond to the estimated rotational position of the wheel (number of teeth of rotor) at the time of transmission from the TPMS sensor 2 to the rotational position (top point) of the wheel 1 detected on the side of wheel at the time of transmission from the TPMS sensor 2. Therefore, it is possible to estimate the wheel position of the TPMS sensor 2 accurately while suppressing a cost increase by using the existing system.

Note that instead of at the time of transmission command (time t2), at the time of actual transmission start (time t3), the rotational position of the wheel 1 (number of rotor teeth z) may be calculated as well. More specifically, assuming the transmission delay of the TPMS sensor 2(time lag Δt0) is zero, the rotational position zt3 at the time t3 is calculated in accordance with the equation below and the calculation results may be used to determine the dispersion degree of each rotational position data for each sensor ID:

$$zt3=zt1+(zt5-zt1)\times(t3-t1)/(t5-t1) \qquad (2)$$

In the first embodiment, in consideration of the time lag Δt0 (=t3−t2) between a transmission command from TPMS sensor 2 to the actual transmission, the rotational position zt2 calculated by the equation (1) is subject to correction by the transmission delay Δt0. Therefore, it is possible to calculate more accurately the rotational position (number of teeth) of each of the wheels when the rotational position of each TPMS sensor 2 actually reaches the reference position (top point). The time lag information Δt0 may be input to the TPMSCU4 (rotational position calculation unit 4a) together with the data transmitted from the TPMS sensor 2, or may be stored in advance in TPMSCU4.

Also, instead of at the transmission starting time (time t2−t3) of the TPMS data, it is also possible to calculate the rotational position of the wheel 1 (number of teeth z in the rotor) at the time of receipt completion (time t4). That is, it is regarded the transmission time of TPMS data, Δt1 (=(t4−t3)), as zero, the rotational position zt4 is calculated by the following equation (3), and this is used as a reference position to determine the dispersion degree of each rotational position data for each sensor ID:

$$zt4=zt1+(zt5-zt1)\times(t4-t1)/(t5-t1) \qquad (3)$$

In the first embodiment, taking into account the transmission time Δt1 of TPMS data, the rotational position zt2 may be calculated in accordance with the equation (1). Thus the rotational position (number of teeth) of each wheel at the time at which the rotational position of each TPMS sensor has reached the reference value (top point) may be calculated reflecting the actual situation.

Figure 10:
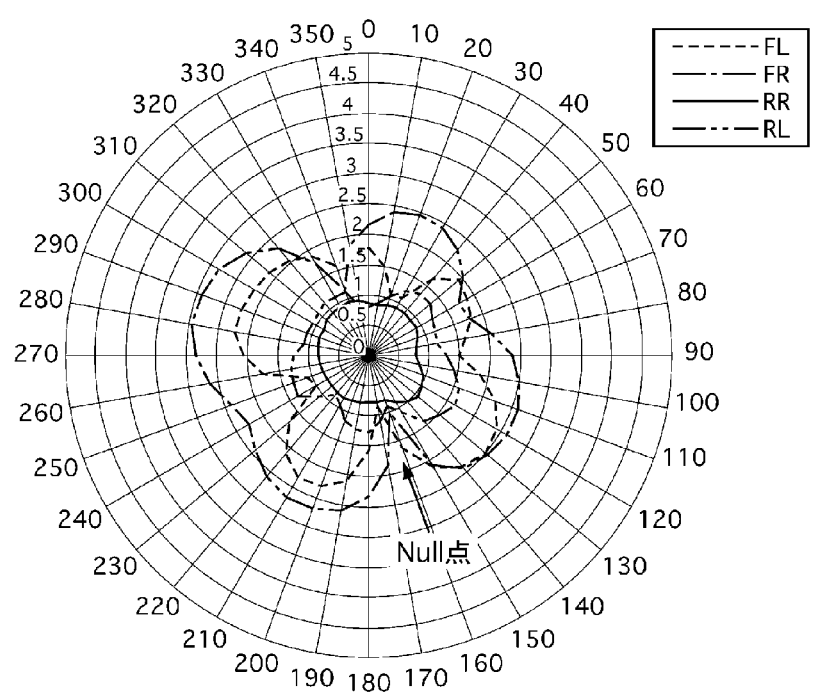
FIG. 10 is a diagram illustrating a Null point of each wheel.

In the first embodiment, the TPMS sensor 2 (transmitter 2d) performs transmission at a reference position (top point). As shown in FIG. 10 as an example, the rotational position (rotational angle) of a transmitter 2d in the wheel 1 has a point or region (or sometimes a plurality thereof) (Null point) in which a signal strength becomes the lowest. When the reference position (top point) at which transmitter 2d is configured to send data is positioned in the vicinity of the Null point, it is difficult for the receiver 3 to receive the data of transmission. Therefore, it may not be able to identify a rotational position (reference position) of the wheel 1 at the time of transmission from the TPMS sensor 2 (transmitter 2d) on the vehicle body side. Therefore, such situations may occur in which the wheel position of the TPMS sensor 2 is not accurately estimated in the automatic learning mode or the time for an estimate completion is extended. Here, in order to improve the reception probability, it is conceivable to duplicate data of the TPMS sensor 2 and to transmit a plurality of frames of the same content. However, the plurality of frames is to be transmitter at different rotational positions. Therefore, only through the duplication of data, it is impossible to specify at which rotational position the received data has been transmitted despite improvement in receiving probability. Thus there is a disadvantage that the rotational position (number of teeth) providing a reference for determining the wheel position of the TPMS sensor 2 may not be identified on the side of vehicle body.

Figure 3B:
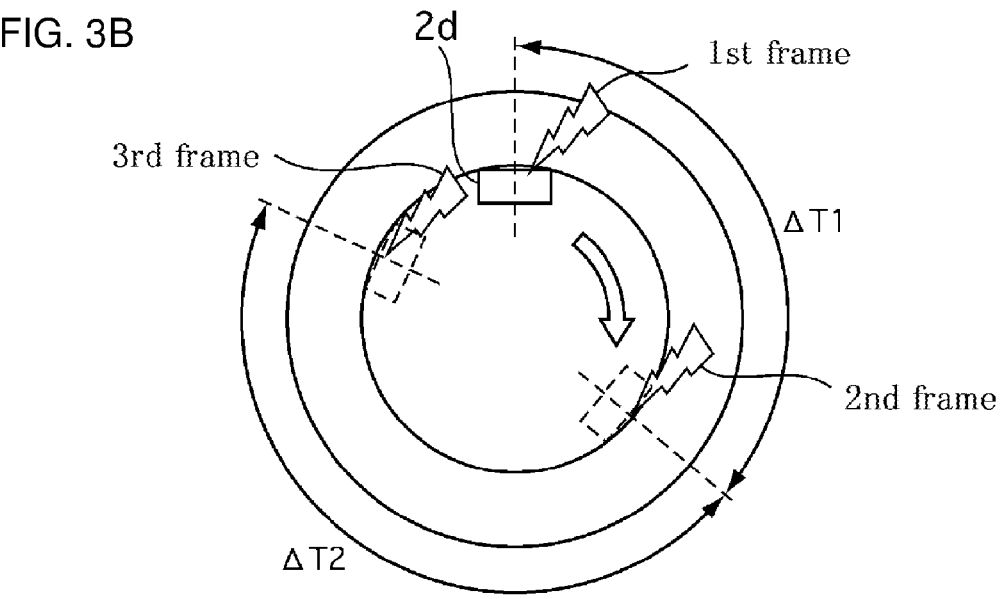
FIG. 3B is another diagram illustrating the transmission method of FIG. 3A of each frame of the TPMS data in the first embodiment.

In contrast, in the first embodiment, the TPMS sensor 2 is configured to transmit a plurality of data (first to third frames) including the rotational position of own (transmitter 2d). More specifically, as shown in FIG. 3B, the TPMS sensor 2 duplicates the TPMS data to make a plurality of frames of the same content (first to third frames) and sends a reference frame (first frame) at a predetermined rotational position at each transmission of the TPMS data. In other words, the first frame is transmitted at a predetermined rotational position (top point), and the rotational position (top point) of the TPMS sensor 2 at the time of the first frame transmission is set as a reference position for determining the wheel position.

More specifically, the first to third frames are sent at a predetermined time interval or cycle (100 msec. 140 msec.) and with the frame number (1 to 3) indicative of the transmission sequence or order attached.

The rotational position calculation unit 4a, upon receipt of any one of the first to third frames, estimates the reference position (top point) at which the TPMS sensor 2 has transmitted the first frame, i.e. the number of teeth zt2.

Thus, by using duplicate data of the TPMS sensor 2 to form a plurality of frames, even if the transmission position of the first frame (top or highest point) is to be located in the vicinity of the Null point, by receiving other frames (a second or third frame), it is possible to improve the reception probability. Note that the number of frames is not limited to three, but may be two, four or more, for example. Further, by the inclusion of the rotational position information (frame number) in each frame, at any receipt of the plurality of frames, based on that received information, the rotational position (number of teeth zt2) at the transmission from the transmitter 2d may be estimated. Therefore, it is possible to detect precisely the rotational position at the time of transmission from the transmitter 2d of each wheel 1 and to determine the wheel position of the TPMS sensor 2 at the time of transmission more accurately. Therefore, the auto-learning mode may be completed early.

Further, the TPMS sensor 2 sends the reference frame (first frame) at a predetermined rotational position (top point) whereas the rotational position calculation unit 4a estimates the predetermined rotational position (number of teeth zt2 at top point) based on the transmission order information (frame number) of the received frame (second frame, for example). In other words, the rotational position for providing a reference to determine the rotational position of the TPMS sensor 2 on the side of vehicle body is set at the rotational position (top point) at which the TPMS sensor 2 outputs the first frame, and this rotational position (number of teeth zt2) providing the reference is calculated based on the other frame (second, third frame) received. Therefore, while simplifying the configuration of the TPMS sensor 2, the rotational position of the TPMS sensor 2 at the transmission (number of teeth zt2) may be estimated on the vehicle body. Stated another way, as described below, different from the first embodiment, it may be conceived that the mechanism to estimate the rotational position of the TPMS sensor at the time of transmission of each frame is mounted on the wheel 1 (TPMS sensor 2), and the information is transmitted to the vehicle body including the estimated rotational position for each frame. By comparison, in the first embodiment, without providing the estimate mechanism described above, by including in each frame the transmission order information (frame number) as the rotational position information, the rotational position (number of teeth zt2) that provides a reference for determination of the wheel position of the TPMS sensor 2 may be identified on the side of vehicle body. Thus, the configuration of the TPMS sensor may be simplified and the cost reduction may be achieved.

Note that the reference position for determination of the wheel position (calculation of the dispersion characteristic value X) is not limited to the rotational position at which the first frame is transmitted, but the rotational position of the second frame transmission or the rotational position of the third frame transmission.

In the case in which the time interval for transmission of each frame is the same (for example, when the transmission interval between the first and second frames and that between the second and third frames are 100 msec.), such a situation may occur in which the rotational position at which each frame is set is the same, Null point. For example, in the case in which the first transmission position is positioned in the vicinity of the Null point, and the rotation period of the wheel 1 and the transmission period of each frame are synchronized with each other, the transmission position of each frame at each rotation of the wheel 1 matches the vicinity of the Null point so that there is a possibility that each frame is not received either. In contrast, in the first embodiment, the transmitter transmits three or more frames (first to third frames) at a different time intervals (100 msec. 140 msec.). Therefore, it is possible to suppress that a transmission period of each frame and the rotation period of the wheel 1 are synchronized. Thus, the situation described above may be avoided and the receiving probability will be improved.

Instead of the order information (frame number) as the rotational position information of the transmitter 2d at the transmission of the frame to be included in each frame by the TPMS sensor 2, the estimation of the rotational position of the transmitter 2d at the transmission of the frame may also be included as well.

For example, the sensor CU2c may calculate the rotational position (rotational angle) of the transmitter 2d based on a gravitational acceleration component of the centrifugal acceleration (the magnitude or signs, or change direction of the component sampled within each rotation period of the wheel 1) detected by the G sensor 2b and adds that rotational position to the frame to be transmitted. In this case, the rotational position calculation unit 4a, upon receipt of any of the plurality of frames, as in the first embodiment (in accordance with the above referenced equation (1), estimate the rotational position (number of teeth) at the time of transmission of the receiving frame based on the count values of the wheel speed pulses and the like, which have been input immediately before and immediately after the receipt of the receiving frame, respectively. In accordance with the correspondence relation between the estimated rotational position (number of teeth) and the rotational position included in the received frame (number of teeth converted from the rotational angle), it is possible to determine the wheel position of the TPMS sensor 2.

For the determination above, the dispersion characteristic value X as in the first embodiment may not be necessarily used. Further, it is not necessary to provide for a reference frame and send the rotational position at the predetermined position (top or highest point, etc.). It suffices to send each frame at an arbitrary rotational position. In other words, the rotational position of the TPMS sensor 2 at the time of transmission of each frame may be a reference position for the wheel position determination. The inter-frame interval (time interval or interval in rotational position) is not necessarily be set as a predetermined value.

In the first embodiment, during the auto-learning mode, it is necessary for the transmission of the next TPMS data (reference frame) to wait for the own rotational position reaching the predetermined position after the elapsed time of 16 seconds of the transmission time of the previous TPMS data. In contrast, in the above example to include an estimate of the rotational position in each frame, it is possible to send the TPMS data (any frame) may be transmitted at any rotational position immediately after the elapsed time of 16 seconds from the previous transmission time. Therefore, during the auto-learning mode, at each transmission time of the TPMS data, the data for the wheel position determination of the TPMS sensor 2 may be acquired more rapidly so that the wheel position of the TPMS sensor 2 may be determined earlier.

In the tire pressure monitoring device of the first embodiment, there are effects to be listed below.

A tire pressure monitoring device for monitoring the air pressure of each tire is disclosed that comprises the following:

a tire pressure detection mechanism installed on the tire of each wheel 1 for detecting the air pressure of the tire (pressure sensor 2a);

a transmitter 2d installed on each wheel for transmitting the air pressure information in a wireless signal with the identification information (sensor ID) unique to each transmitter 2d included in this wireless signal;

a receiver 3 mounted on the side of vehicle body for receiving the wireless signal;

a rotational position detection mechanism (wheel speed sensor 8, ABSCU6) installed on the vehicle body in correspondence with each wheel 1 for detecting the rotational position (wheel speed pulse) of each wheel 1 and outputting the rotational position information (count value of the wheel speed pulses) in a predetermined time interval ΔT0 (period 20 msec) to a communication line (CAN communication line 7);

a vehicle body side rotational position estimate mechanism (rotational position calculation unit 4a) installed on the vehicle body for estimating the rotational position (number of teeth) of the transmitter 2d at the time of transmission (transmission command time t2) based on the wireless received information from the transmitter 2d (receipt completion time t4) and the rotational position (number of teeth, zt1, zt5) input via a communication line (CAN communication line 7); and a wheel position determination mechanism (wheel position determination unit 4c) for identifying the wheel position (FL to RR) of the wheel 1 on which the transmission 2d is mounted based on the estimated rotational position (number of teeth zt2) and the indemnification information (sensor ID) included in the wireless signal.

Thus, while suppressing the increase in cost by using the existing system, with respect to each wheel, the rotational position (number of teeth zt2) at the time of transmission of the wireless signal from the transmitter 2d may be detected more accurately on the vehicle body side so that the wheel position of the TPMS sensor 2 (transmitter 2d) may be determined more accurately. Therefore, it is possible to complete the automatic learning mode earlier.

More specifically, the vehicle body-side rotational position estimate mechanism (rotational position calculation unit 4a) estimates the rotational position (number of teeth zt2) at the time of transmission from the transmitter 2d (transmission command time t2) based on the rotational positions of the wheel 1 (number of teeth zt1, zt5) which are input immediately before a reception start (time t3) of the wireless signal from the transmitter 2d and immediately after the receipt completion (time t4) via a communication line (CAN communication line 7), the time of input of rotational position of this wheel 1 t1, t5, the above described receiving start time t3 or receipt completion time t4.

Therefore, it is possible to accurately detect the rotational position (number of teeth zt2) at the time of transmission of the transmitter 2d on the vehicle body side so that the wheel position of the TPMS sensor 2 (transmitter 2d) may be determined more accurately.

The rotational position estimate mechanism on the vehicle body side (rotational position calculation unit 4a) corrects a transmission delay Δt0 of the transmitter 2d included in the received information of the wireless signal. Therefore, it is possible to detect the rotational position (number of teeth zt2) on the vehicle body side more accurately so that the wheel position of the TPMS sensor 2 (transmitter 2d) may be determined more precisely.

The transmitter 2d sends the wireless signal in duplicate as a plurality of frames (first to third frames) and the rotational position estimate mechanism on the vehicle body side (rotational position calculation unit 4a) estimate the rotational position (number of teeth zt2) at the transmission of the transmitter 2d (transmission command time t2) based on the received information out of the plurality of the frames (for example, the receipt completion time t4' of the second frame and the frame number).

Therefore, by improving the receiving probability through avoidance of the Null point, the wheel position of the TPMS sensor 2 (transmitter 2d) may be determined more accurately.

The transmitter 2d transmits each frame at intervals from each other and causes the rotational position information (frame number) of the transmitter 2d to be included in each frame at the transmission of the frame. Therefore, it is possible to determines more accurately the wheel position of the TPMS sensor (transmitter 2d) while improving the reception probability.

Each wheel 1 is provided with a rotational position estimate mechanism (G sensor 2b, sensor CU2c) that estimates the rotational position of the transmitter 2d at the transmission of each frame, and the transmitter 2d may be configured to include in each frame the estimated rotational position as rotational position information. In this case, since it is sufficient to transmit each frame at any rotational position, it is possible to determine the wheel position of the TPMS sensor 2 (transmitter 2d) earlier.

The transmitter 2d is configured to send a predetermined reference frame (first frame for example) out of the plurality of frames (first to third frames) at a predetermined rotational position (top point), transmits each frame at a predetermined interval (interval 100 msec time, 140 msec), and includes as the rotational position information the transmission order information (frame number). The rotational position estimate mechanism (rotational position calculation unit 4a) estimates the predetermined rotational position described above (number of teeth at top point zt2) based on the received information (receipt completion time t4' and frame number). The wheel position determination mechanism (wheel position determination unit 4c) in turn determines the position of wheel 1 (FL to RR) on which the transmitter 2d is installed or mounted.

That is, the transmission order information (frame number) attached to each frame (second, third frames) indicates, combined with the information about the predetermined interval (time interval 100 msec., 140 msec.), the rotational position information of the transmitter 2d at the time of the transmission of that frame (second and third frames). Thus, it is not necessary to provide a mechanism for estimating the rotational position of the TPMS sensor 2 (transmitter 2d) in each wheel 1 at the time of transmission of each frame so that the configuration may be simple.

The transmitter 2d transmits each frame (first to third frames) with different time intervals (100 msec, 140 msec) placed from each other. Thus, the vehicle body-side rotational position estimate mechanism (rotational position calculation unit 4a) may estimate the predetermined rotational position (number of teeth zt2) based on the received information (receiving completion time t4 and frame number), on the basis of the (frame number and reception completion time t4') received information (second frame, for example), given what was received out of a plurality of frames (number of teeth z in the highest point of the rotational position t2 and it is possible to estimate).

The transmitter 2d transmits three or more frames (first to third frames) at a different time intervals (100 msec, 140 msec). Therefore, by suppressing a situation where the rotation period of the wheel 1 and transmission period of each frame are synchronized and the transmission position of each frame matches the vicinity of the Null point, it is possible to improve the reception probability.

Figure 11:
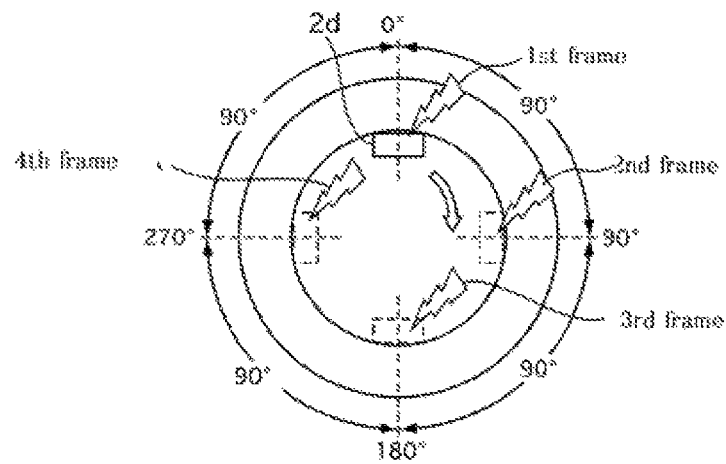
FIG. 11 is a diagram illustrating a transmission method of each frame of the TPMS data in a second embodiment.

In the second embodiment, in a constant or fixed position transmission mode, each TPMS sensor 2 transmits a plurality of data sets (for example first to fourth frames) including own (i.e. of the transmitter 2d) rotational position information. As shown in FIG. 11, the TPMS sensor 2 is configured to transmit a single frame (first frame) per transmission of the TPMS data at a predetermined rotational position (reference position=top or highest point) with a predetermined rotation position interval (for example 90 degrees) placed from each other. Further, in the other frames (second to fourth frames), the rotational position information of the transmitter 2d at the time of transmission of the relevant frame. More specifically, the TPMS sensor 2 causes transmission order information (frame number) to be included in each frame. The rotational position calculation unit 4a, upon receipt of any one of the first to four frames, based on the frame number and the rotational position interval (90 degrees), a reference position (top point) at which the TPMS sensor 2 has sent the first frame, i.e. the number of teeth zt2 is estimated.

For example, the rotational position calculation unit 4a calculates, when the received frame happens to be the third frame, the rotational position (number of teeth) at which the third frame has been sent in a manner similar to the equation (1) above. By subtracting the rotational position interval between the first and third frames (number of rotor teeth corresponding to "90 degrees×2"=180 degrees) from the calculated rotational position (number of teeth) to calculate the predetermined rotational position at which the first frame has been transmitted. Since the other configurations are the same, their description is omitted.

Therefore, it is possible as in the first embodiment, while improving the reception probability, to accurately estimate the wheel position of the TPMS sensor 2 to complete the automatic learning mode early. Incidentally, in order to improve the reception probability, it is also possible to make the inter-frame rotational position interval different or to increase the number of frames.

In addition, as the rotational position information included in each frame, the estimate of the rotational position (by the sensor CU2c) of the transmitter 2d at the time of transmission of that frame. In this case, the reference position for transmitting the first frame is not limited to a specific rotational position (such as top point).

In the tire pressure monitoring device in the second embodiment, the following effects may be obtained.

The transmitter 2d transmits each frame (first to fourth frames) with a predetermined rotational position interval (90 degrees for example). Thus, combined with the information of the predetermined rotational position interval (90 degrees), the transmission order information (frame number) added to each frame (second, third frames) represents the rotational position information of the transmitter 2d at the time of transmission of the frame (second, third frames). Therefore, the vehicle body-side rotational position estimate mechanism (rotational position calculation unit 4a), based on the received information (receipt completion time t4', and frame number) of the received one (for example of the second frame) among the plurality of the frames, may estimate the predetermined rotational position (number of teeth zt2 at top point).

In the third embodiment, in a fixed or constant position transmission mode, each TPMS sensor 2 is configured to transmit a plurality groups (first to fourth groups for example) of a plurality of frames (first to third frames for example) including own (of the transmitter 2d) rotational position information per transmission of the TPMS data. In the third embodiment, a set of four groups is provided and each group has first to third frames respectively. Thus, the number of frames to be sent by the TPMS sensor 2 amounts to 12 (=4×3) in total.

Figure 12:
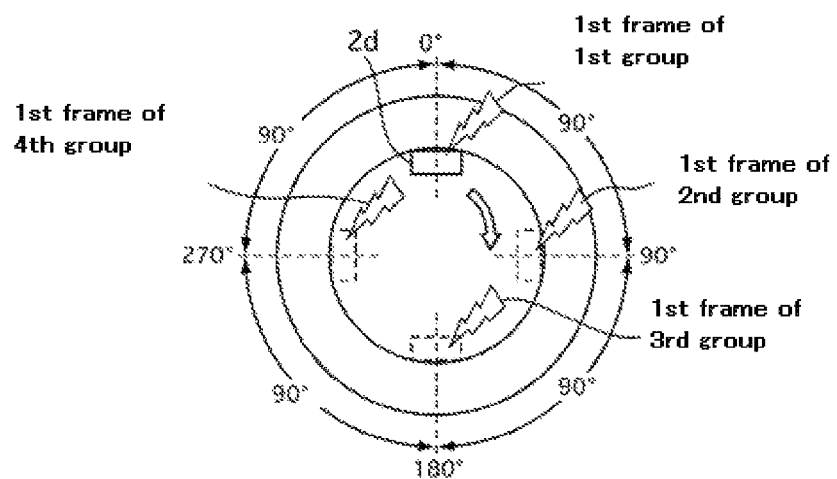
FIG. 12 is a diagram illustrating a transmission method of each frame of the TPMS data in a third embodiment.

As shown in FIG. 12, the TPMS sensor 2 (transmitter 2d) transmits, at a plurality (four) of predetermined rotational positions (reference position for each group) that are spaced from each other, transmits a single frame (first frame) of the corresponding group. More specifically, the sensor CU2c calculates, during the fixed position transmission mode, the rotational position of the TPMS sensor 2 (transmitter 2d) of the TPMS sensor 2 based on a gravitational acceleration dependent component of the centrifugal acceleration detected by the G sensor 2b, transmits the first frame of the first group at the top point ("0" degree), transmits the first frame of the second group at the rearmost point (90 degrees), transmits the first frame of the third group at the lowermost point (180 degrees), and transmits the first frame of the fourth group at the forefront point (270 degrees). The TPMS sensor 2, after transmitting the first frame of each frame at the reference position of each group (top or highest point, rearmost point, lowermost point, and forefront point), transmits the other frames of the same group (second, third frames) in the same manner as the first embodiment. That is, with placing a predetermined time interval (100 msec., 140 msec.), the second and third frames will be transmitted. In addition, the information of the group with which the frame is associated (group number, or flag corresponding to the reference position of each group) is attached.

For example, the TPMS sensor 2 transmits the first frame of the second group at the reference position of the second group (rearmost point at 90 degrees), transmits the second frame 100 msec. thereafter, transmits a third frame 140 msec. thereafter. The rotation position calculation unit 4a, upon receipt of any one of the first to third frames of the second group, based on the frame number thereof (i.e. one to three) and the above referenced time interval (100 msec., 140 msec.), estimates the reference position of the second group (rearmost point), i.e., the number of teeth zt2. Further, the rotational position calculation unit 4a, based on the group number attached to the received frame, converts the reference position (number of teeth at rearmost point) of the second group described above, i.e. number of teeth zt2 to the reference position of the first group (number of teeth at the highest or top point). More specifically, by subtracting the number of teeth corresponding to the rotational position interval between the first and second group (i.e. 90 degrees) from the estimated reference position (rearmost point) of the second group, the number of teeth zt2 at the reference position (top point) of the first group is calculated.

When receiving the frames of the other groups (third, fourth group), the number of teeth zt2 of the reference position of the first group (top point) is calculated in a similar manner. The dispersion calculation unit 4b calculates the dispersion characteristic value X of the number of teeth zt2 of the reference position (top point). That is, with reference to the calculated reference position (top point) of the first group, the wheel position of the TPMS sensor 2 is determined. Since the other configurations as the same as the first embodiment, description thereof is omitted.

Now, description of the operation is given. The Null point is not limited to one location. There may be a plurality of locations thereof. In the latter case, as in the first embodiment, even if transmission of each frame takes place at different time intervals (100 msec., 140 msec.), depending on the rotation period (rotation speed) of wheel 1, in other words, a vehicle speed, the transmission positions of all the flames match (a plurality of) the vicinity of the Null points so that the situation may arise in which no frame is received. In contrast, in the third embodiment, due to the above configuration, such situation may be avoided to occur. Thus, while improving further the receiving probability of the frame, the rotational position (number of teeth at the reference position of the first group) may be identified on the vehicle body side more reliably.

Note that the dispersion characteristic value X of the number of teeth at the reference position may be calculated for each group. In the third embodiment, by converting all the received data into the reference position of the first group (number of teeth at top point), a significant difference in dispersion value X of the self-wheel and the other wheels may be produced more rapidly. Therefore, it is possible to estimate the wheel position of the TPMS sensor 2 more accurately within short time. Note that the reference position for the wheel position determination (calculation of the dispersion characteristic value) may not be restricted to the reference position (top point) of the first group, but may be collected or aggregated to a reference position (rear most point) of the other group (second group, for example).

The TPMS sensor 2 (transmitter 2*d*), as in the second embodiment, may be configured to transmit the frames of each group (first to third frames) at predetermined rotational position intervals. Further, the TPMS sensor 2 may be configured to provide predetermined rotational positions (reference positions of each group) at which the first frame is transmitted for each group, with a predetermined time interval placed. In this case as well, by subtracting the number of teeth corresponding to the predetermined time interval, the number of teeth at the reference position of the first group (top point) may be calculated. In the third embodiment, since the reference positions of each group are provided at a predetermined rotational position interval from each other, the calculation may be made simple.

In addition, as the rotational position information to be included in each frame, an estimate value of the rotational position of the transmitter 2*d* at the time of transmission of that frame (by the sensor CU2*c*) may be included. In this case, the reference position at which the first frame of each group is not limited to a specific rotational position (top point etc.). Further, the number of groups is not limited to four, but may be 2, 3, 5 or other number.

In the tire pressure monitoring device of the third embodiment, there is an effect to be listed below.

The transmitter 2*d* transmits a plurality of frames (first to third frames) in a plurality of groups (first to fourth group), and transmits, at a predetermined rotational position (top or highest point, rearmost or end point, lowermost point, and forefront or anterior point) provided for each group at a predetermined interval (90 degrees), a reference frame of each group (first frame, for example).

Therefore, it is possible to improve the reception probability and to identify more reliably the rotational position (number of teeth at the reference position of the first group) as a criterion of the wheel position of the transmitter 2*d*.

The transmitter 2*d* includes group information (group number) in each frame (first to third frames) indicative to which group the frame belongs. The rotational position estimate mechanism on the vehicle body (rotational position calculation unit 4*a*) estimates a predetermined rotational position (number of teeth at top point) for a predetermined reference group (first group, for example) among a plurality of groups (first to fourth group) based on the predetermined rotational position (number of teeth at rearmost point) of the group to which the frame is estimated to belong (second group, for example) with respect to the received frame and the group information (group number). Further, the wheel position determination mechanism (wheel position determination unit 4*c*) determines the position of the wheel 1 on which the transmitter 2*d* is installed or mounted based on the predetermined rotational position (number of teeth at top point) of the estimated reference group (first group). Thus, by converting all the received data to a reference position (number of teeth zt2 at the top point) of a reference group (first group), the wheel position of the transmitter 2*d* may be estimated accurately within a shorter period of time.

While best embodiments have been described to implement the present invention, the specific configuration is not limited to these embodiments. Rather, the design change or alterations that do not depart the essence of the present invention may be included in the present invention.

For example, in the embodiments, an example is shown using a wheel speed sensor as a rotational position detection mechanism. However, in a vehicle provided with an in-wheel motor as power source, the rotational angel may be detected using a resolver of an electric motor.

The invention claimed is:

1. A tire pressure monitoring device for a vehicle with a plurality of wheels comprising:
   a tire pressure detection mechanism installed on the tire of each wheel for detecting the air pressure of the tire;
   a transmitter installed on each wheel for transmitting the air pressure in a wireless signal with identification information unique to each transmitter included in the wireless signal;
   a receiver mounted on the side of a vehicle body for receiving the wireless signal;
   a rotational position detection mechanism installed on the vehicle body in correspondence with each wheel for detecting a rotational position of each wheel and outputting the rotational position at a predetermined time interval to a communication line;
   a vehicle body side rotational position estimate mechanism installed on the vehicle body, the vehicle body side rotational position estimate mechanism configured, for each wheel, to:
   receive a transmitted wireless signal,
   determine a receiving start time and a receiving completion time of the received transmitted wireless signal, and a time of a transmission command or a time of actual transmission of the received transmitted wireless signal,
   determine a rotational position of the wheel immediately before the receiving start time and a rotational position of the wheel immediately after the receiving completion time based on the rotational position at the predetermined time interval, the receiving start time and the receiving completion time, and
   estimate the wheel's rotational position at the time of the transmission command, the time of actual transmission or at the time of receipt completion of the wireless signal based on:
   the rotational position of the wheel immediately before the receiving start time,
   the rotational position of the wheel immediately after the receiving completion time, and
   the respective times of input of the rotational position of the wheel immediately before the receiving start time and immediately after the receiving completion time; and
   a wheel position determination mechanism for identifying a position of the wheel on which the transmitter is installed based on the estimated rotational position and the identification information included in the wireless signal.

2. The tire pressure monitoring device as claimed in claim 1, wherein the vehicle body side rotational position estimate mechanism corrects a transmission delay of the transmitter included in the information received in the wireless signal.

3. The tire pressure monitoring device as claimed in claim 1, wherein the transmitted wireless signal is included in a plurality of frames transmitted from the transmitter, the plurality of frames each including duplicates of the wireless signal.

4. The tire air pressure monitoring device as claimed in claim 3, wherein the transmitter transmits each of the plurality of frames at intervals from each other and causes rotational position information indicating an estimated rotational position of the transmitter at the transmission of each frame to be included in each frame.

5. The tire air pressure monitoring device as claimed in claim 4, wherein each wheel is provided with a rotational position estimate mechanism that estimates the estimated rotational position of the transmitter at the transmission of each frame, the transmitter configured to include in each frame the estimated rotational position as rotational position information.

6. The tire air pressure monitoring device as claimed in claim 4, wherein each wheel is provided with a rotational position estimate mechanism that estimates the rotational position of the transmitter at the transmission of each frame, wherein the transmitter is configured to send a predetermined reference frame out of the plurality of frames at a predetermined rotational position, transmit each frame at a predetermined interval, and include as the rotational position information a transmission order information, wherein the rotational position estimate mechanism estimates the predetermined rotational position based on the information received among the plurality of the frames, and wherein the wheel position determination mechanism determines the position of wheel on which the transmitter is installed.

7. The tire air pressure monitoring device as claimed in claim 6, wherein the transmitter transmits each frame with different time intervals placed from each other.

8. The tire air pressure monitoring device as claimed in claim 6, wherein the plurality of frames includes three or more frames transmitted with different time intervals placed from each other.

9. The tire air pressure monitoring device as claimed in claim 6, wherein the transmitter transmits each frame with a predetermined rotational position interval.

10. The tire pressure monitoring device as claimed in claim 1, wherein the vehicle body side rotational position estimate mechanism configured, for each wheel, to estimate the wheel's rotational position at the time of transmission of the wireless signal based on the equation:

$$z = zt1 + (zt5 - zt1) * (t - t1)/(t5 - t1),$$

wherein:
  $z$ is the estimated rotational position,
  $zt1$ is the rotational position of the wheel immediately before the receiving start time input via the communication line,
  $zt5$ is the rotational position of the wheel immediately after the receiving completion time input via the communication line,
  $t1$ and $t5$ are the respective times of input of the rotational position of the wheel immediately before the receiving start time and immediately after the receiving completion time, and
  $t$ is a time based on the receiving start time or the receipt completion time.

11. A tire pressure monitoring device for a vehicle with a plurality of wheels comprising:
  a tire pressure detection mechanism installed on a tire of each wheel for detecting the air pressure of the tire;
  a transmitter installed on each wheel for transmitting the air pressure in a wireless signal with identification information unique to each transmitter included in the wireless signal;
  a receiver mounted on a vehicle body for receiving the wireless signal;
  a rotational position detection mechanism installed on the vehicle body in correspondence with each wheel for detecting a rotational position of each wheel and outputting the rotational position at a predetermined time interval to a communication line;
  a vehicle body side rotational position estimate mechanism installed on the vehicle body, the vehicle body side rotational position estimate mechanism configured, for each wheel, to:
    receive a transmitted wireless signal,
    determine a time of a transmission command, a time of actual transmission or a time of receipt completion of the wireless signal,
    determine a rotational position of the wheel and a respective time before the receiving the wireless signal based on the rotational position at the predetermined time interval and receipt of the transmitted wireless signal,
    determine a rotational position and a respective time of the wheel after the receiving the wireless signal based on the rotational position at the predetermined time interval and receipt of the transmitted wireless signal, and
    estimate the wheel's rotational position at the time of the transmission command, the time of actual transmission or at the time of receipt completion of the wireless signal based on:
      the rotational position of the wheel before receiving the wireless signal,
      the rotational position of the wheel after receiving the wireless signal, and
      the respective times of input of the rotational position of the wheel before and after receiving the wireless signal; and
  a wheel position determination mechanism for identifying a position of the wheel on which the transmitter is installed based on the estimated rotational position and the identification information included in the wireless signal.

* * * * *